United States Patent
Hosokawa et al.

(10) Patent No.: US 8,605,470 B2
(45) Date of Patent: *Dec. 10, 2013

(54) POWER CONVERTER PERFORMING SOFT SWITCHING

(75) Inventors: Yasuhiko Hosokawa, Minato-ku (JP); Toshifumi Ise, Suita (JP); Hirotake Nakaji, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 13/266,054

(22) PCT Filed: Apr. 27, 2009

(86) PCT No.: PCT/JP2009/058252
§ 371 (c)(1),
(2), (4) Date: Oct. 24, 2011

(87) PCT Pub. No.: WO2010/125630
PCT Pub. Date: Nov. 4, 2010

(65) Prior Publication Data
US 2012/0051103 A1    Mar. 1, 2012

(51) Int. Cl.
*H02H 7/122* (2006.01)
*H02M 3/335* (2006.01)

(52) U.S. Cl.
USPC .................................... 363/56.01; 363/16

(58) Field of Classification Search
USPC ............. 363/16, 17, 24–27, 56.06–56.08, 95, 363/98, 131–133, 135, 136, 139, 363/56.01–56.02
See application file for complete search history.

(56) References Cited

U.S. PATENT DOCUMENTS

| | | | | |
|---|---|---|---|---|
| 4,276,588 | A * | 6/1981 | McLyman et al. | 363/24 |
| 5,198,969 | A * | 3/1993 | Redl et al. | 363/17 |
| 5,513,088 | A * | 4/1996 | Williamson | 363/21.18 |
| 6,366,474 | B1 * | 4/2002 | Gucyski | 363/20 |
| 7,158,389 | B2 * | 1/2007 | Yasumura | 363/17 |
| 7,706,161 | B2 * | 4/2010 | Quazi | 363/89 |

(Continued)

FOREIGN PATENT DOCUMENTS

| | | |
|---|---|---|
| JP | 05 068380 | 3/1993 |
| JP | 05 502365 | 4/1993 |

(Continued)

OTHER PUBLICATIONS

U.S. Appl. No. 13/391,947, filed Feb. 23, 2012, Tamai, et al.

(Continued)

*Primary Examiner* — Timothy J Dole
*Assistant Examiner* — Yusef Ahmed
(74) *Attorney, Agent, or Firm* — Oblon, Spivak, McClelland, Maier & Neustadt, L.L.P.

(57) ABSTRACT

A power converter converts DC power supplied from a first DC power supply and a second DC power supply into AC power and supplies the AC power to a load. The power converter includes a protection circuit for allowing a charging current, which is possibly to flow from the first DC power supply and the second DC power supply to a first snubber capacitor or a second snubber capacitor, to flow to another current path, when a voltage applied to the first snubber capacitor becomes a predetermined value or more or when a voltage applied to the second snubber capacitor becomes a predetermined value or more.

6 Claims, 13 Drawing Sheets

(56) References Cited

U.S. PATENT DOCUMENTS

| | | | |
|---|---|---|---|
| 7,974,113 B2* | 7/2011 | Shimada et al. | 363/98 |
| 8,009,448 B2* | 8/2011 | Liu | 363/56.12 |
| 8,207,717 B2* | 6/2012 | Uruno et al. | 323/262 |
| 8,400,799 B2* | 3/2013 | Fujiyoshi et al. | 363/98 |
| 2002/0054499 A1* | 5/2002 | Tanaka et al. | 363/132 |
| 2011/0216557 A1* | 9/2011 | Fujiyoshi et al. | 363/21.09 |
| 2012/0182772 A1* | 7/2012 | Hosokawa et al. | 363/56.12 |

FOREIGN PATENT DOCUMENTS

| | | |
|---|---|---|
| JP | 2001 054279 | 2/2001 |
| JP | 2002 199737 | 7/2002 |
| WO | 92 05625 | 4/1992 |

OTHER PUBLICATIONS

Combrink, F. W., et al., "Design Optimization of an Active Resonant Snubber for High Power IGBT Converters," IEEE Transactions on Power Electronics, vol. 21, No. 1, pp. 114-123, (Jan. 2006).

Murai, Y., et al., "A Simple-Control Newsoft-Switched PWM Inverter," IEEE, pp. 1307-1312, (1998).

International Search Report Issued Jul. 21, 2009 in PCT/JP09/058252 Filed Apr. 27, 2009.

U.S. Appl. No. 13/497,168, filed Mar. 20, 2012, Hosokawa, et al.

* cited by examiner

POWER CONVERTER PERFORMING SOFT SWITCHING

TECHNICAL FIELD

The present invention relates to a power converter, and particularly to a power converter performing soft switching.

BACKGROUND ART

Soft-switching inverters have been developed that perform soft switching, namely zero-current switching of turning a switch device on or off under the condition that the current flowing through the switch device is zero, and zero-voltage switching of turning a switch device on or off under the condition that the voltage applied to the switch device is zero. In the soft-switching inverters, such soft switching can be used to reduce switching noises and switching losses.

Examples of the soft-switching inverters are disclosed in Frederik W. Combrink et al., IEEE TRANSACTIONS ON POWER ELECTRONICS, Vol. 21, No. 1, January 2006 (Non-Patent Literature 1) and Japanese National Patent Publication No. 5-502365 (Patent Literature 1).

CITATION LIST

Patent Literature

PTL 1: Japanese National Patent Publication No. 5-502365

Non-Patent Literature

NPL 1: Frederik W. Combrink et al., IEEE TRANSACTIONS ON POWER ELECTRONICS, Vol. 21, No. 1, January 2006

SUMMARY OF INVENTION

Technical Problem

The soft-switching inverter disclosed in NPL 1, however, is implemented on the condition that the load current is large to a certain extent. According to the sequence shown in FIG. 2 of NPL 1 for example, a snubber capacitor Crp is charged extremely slowly in the period from time 0 to time t1 if the load current is extremely small, which results in a long time taken for the operation to change to the operation of the period from time t1 to time t2. Namely, it takes a very long time for the current to be transferred to snubber capacitor Crp.

In order to avoid the phenomenon as described above, a main switch Gn may be turned on when a predetermined time has passed from time 0, namely the time when a main switch Gp was turned off. When main switch Gn is turned on while snubber capacitor Crp is charged in the period from time 0 to time t1, resonance between snubber capacitor Crp and anode reactors Lbp and Lbn causes snubber capacitor Crp to be charged. When the voltage of snubber capacitor Crp thereafter reaches the power supply voltage, the current flowing through main switch Gn begins to decrease. The current flowing through main switch Gn finally becomes zero, which causes main switch Gn to turn off and a main diode Dn to conduct. The operation accordingly changes to the operation in the period from time t2 to time t3.

If, however, the above-described resonance is used to charge snubber capacitor Crp, snubber capacitor Crp is overcharged to a voltage higher than the power supply voltage. If the load current is as close as possible to zero, snubber capacitor Crp is charged through the resonance to twice the power supply voltage at the maximum. Since the charging voltage of snubber capacitor Crp is applied to main switch Gn and main diode Dn, these devices are required to have a breakdown voltage of at least twice the power supply voltage. This results in problems of an increased size and a high cost of the soft-switching inverter. PTL 1 does not disclose a configuration aiming to solve these problems.

The present invention has been made for solving the above-described problems, and an object of the present invention is to provide a power converter performing soft switching and capable of preventing a high voltage from being applied under a light load condition.

Solution to Problem

A power converter according to an aspect of the present invention converts DC power into AC power and supplies the AC power to a load, the DC power being supplied from a first DC power supply having a first electrode and a second electrode and a second DC power supply having a first electrode connected to the second electrode of the first DC power supply and a second electrode, the power converter including: a first main switch having a first end coupled to the first electrode of the first DC power supply and a second end coupled to the load; a first main diode connected in parallel with the first main switch so that the first main diode and the first main switch conduct in respective directions opposite to each other; a first snubber capacitor connected in parallel with the first main switch and the first main diode; a first snubber diode connected in series with the first snubber capacitor and connected between the first snubber capacitor and the second end of the first main switch, so that the first snubber diode and the first main switch conduct in the same direction; a first auxiliary switch and a first auxiliary reactor connected between a connection node of the first DC power supply and the second DC power supply and a connection node of the first snubber capacitor and the first snubber diode and connected in series to each other; a second main switch having a first end coupled to the second end of the first main switch and a second end coupled to the second electrode of the second DC power supply, and provided so that the second main switch and the first man switch conduct in the same direction; a second main diode connected in parallel with the second main switch so that the second main diode and the second main switch conduct in respective directions opposite to each other; a second snubber capacitor connected in parallel with the second main switch and the second main diode; a second snubber diode connected in series with the second snubber capacitor and connected between the second snubber capacitor and the first end of the second main switch, so that the second snubber diode and the second main switch conduct in the same direction; a second auxiliary switch and a second auxiliary reactor connected between a connection node of the first DC power supply and the second DC power supply and the first auxiliary switch or the first auxiliary reactor, and a connection node of the second snubber capacitor and the second snubber diode, and connected in series to each other; and a protection circuit for allowing a charging current that is possibly to flow from the first DC power supply and the second DC power supply to the first snubber capacitor or the second snubber capacitor, to flow to another current path, in a case where a voltage applied to the first snubber capacitor becomes a predetermined value or more or in a case where a voltage applied to the second snubber capacitor becomes a predetermined value or more.

Preferably, the protection circuit has a current path between the first electrode of the first DC power supply and the second electrode of the second DC power supply, and causes the charging current to flow between the first electrode of the first DC power supply and the second electrode of the second DC power supply through the current path, in a case where a voltage applied to the first snubber capacitor becomes a predetermined value or more or in a case where a voltage applied to the second snubber capacitor becomes a predetermined value or more.

More preferably, the protection circuit receives a voltage that is a difference between an output voltage of the first DC power supply and the second DC power supply and a voltage applied to the first snubber capacitor, or a voltage that is a difference between an output voltage of the first DC power supply and the second DC power supply and a voltage applied to the second snubber capacitor, generates a voltage by stepping up the received voltage and, based on the generated voltage, switches whether or not to flow the charging current between the first electrode of the first DC power supply and the second electrode of the second DC power supply through the current path.

More preferably, the protection circuit is connected between the second end of the first main switch and the first end of the second main switch.

Preferably, the protection circuit receives a voltage that is a difference between an output voltage of the first DC power supply and the second DC power supply and a voltage applied to the first snubber capacitor, or a voltage that is a difference between an output voltage of the first DC power supply and the second DC power supply and a voltage applied to the second snubber capacitor, generates a voltage by stepping up the received voltage and, based on the generated voltage, switches whether or not to flow the charging current to another current path.

Preferably, the protection circuit includes: a primary winding connected between the second end of the first main switch and the first end of the second main switch; a secondary winding connected between the first electrode of the first DC power supply and the second electrode of the second DC power supply, and magnetically coupled with the primary winding; and a clamp diode connected between the first electrode of the first DC power supply and the second electrode of the second DC power supply, and connected in series with the secondary winding.

Advantageous Effects of Invention

In accordance with the present invention, soft switching is performed and a high voltage can be prevented from being applied under a light load condition.

DESCRIPTION OF EMBODIMENTS

Figure 1:
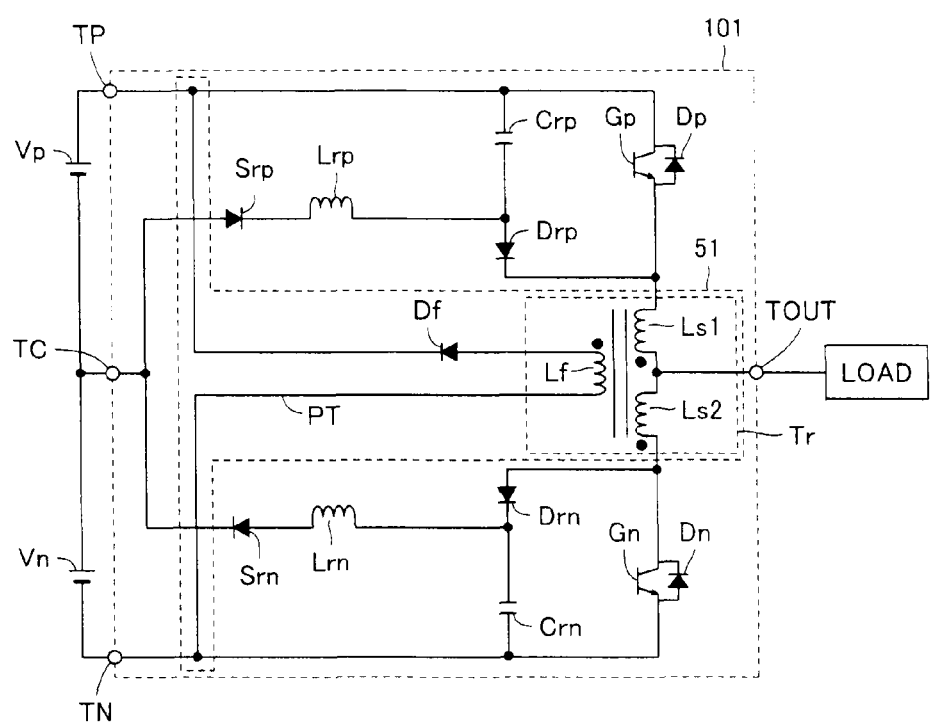
FIG. 1 is a diagram showing a configuration of a soft-switching inverter according to a first embodiment of the present invention.

Embodiments of the present invention will hereinafter be described with reference to the drawings. In the drawings, the same or corresponding components are denoted by the same reference characters, and a description thereof will not be repeated.

<First Embodiment>

FIG. 1 is a diagram showing a configuration of a soft-switching inverter according to a first embodiment of the present invention.

Referring to FIG. 1, soft-switching inverter (power converter) 101 includes DC power supplies Vp, Vn, power supply terminals TP, TC, TN, an AC output terminal TOUT, main switches Gp, Gn, main diodes Dp, Dn, snubber capacitors Crp, Crn, snubber diodes Drp, Drn, auxiliary switches Srp, Srn, auxiliary reactors Lrp, Lrn, and a protection circuit 51. Protection circuit 51 includes a transformer Tr and a clamp diode Df. Transformer Tr includes primary windings Ls1, Ls2 and a secondary winding Lf. Here, soft-switching inverter 101 may be configured to include DC power supplies Vp, Vn.

Main switches Gp, Gn are for example IGBTs (Insulated Gate Bipolar Transistors). Auxiliary switches Srp, Srn are for example reverse blocking thyristors.

DC power supplies Vp and Vn are connected in series. Specifically, DC power supply Vp has a positive electrode connected to power supply terminal TP and a negative electrode connected to power supply terminal TC. DC power supply Vn has a positive electrode connected to the negative electrode of DC power supply Vp and power supply terminal TC, and a negative electrode connected to power supply terminal TN.

Main switch Gp has a collector coupled to the positive electrode of DC power supply Vp, and an emitter coupled to a load via AC output terminal TOUT. Specifically, main switch Gp has its collector connected to power supply terminal TP, and its emitter connected to a first end of primary winding Ls1 of transformer Tr. Main diode Dp is connected in parallel with main switch Gp so that main diode Dp and main switch Gp conduct in respective directions opposite to each other. Specifically, main diode Dp has a cathode connected to the collector of main switch Gp, and an anode connected to the emitter of main switch Gp. Snubber capacitor Crp is connected in parallel with main switch Gp and main diode Dp. Snubber diode Drp is connected in parallel with main switch Gp and main diode Dp and connected in series with snubber capacitor Crp, so that snubber diode Drp conducts in the same direction as main switch Gp. Specifically, snubber diode Drp has an anode connected to a second end of snubber capacitor Crp and to a second end of auxiliary reactor Lrp, and a cathode connected to the emitter of main switch Gp and the anode of main diode Dp. Auxiliary switch Srp and auxiliary reactor Lrp are connected between the connection node of DC power supply Vp and DC power supply Vn, namely power supply terminal TC, and the connection node of snubber capacitor Crp and snubber diode Drp, and are connected in series to each other. Specifically, auxiliary switch Srp has an anode connected to power supply terminal TC, and a cathode connected to a first end of auxiliary reactor Lrp. Auxiliary reactor Lrp has the first end connected to the cathode of auxiliary switch Srp, and the second end connected to the connection node of snubber capacitor Crp and snubber diode Drp.

Main switch Gn has a collector coupled to the emitter of main switch Gp and an emitter coupled to the negative electrode of DC power supply Vn, and provided so that main switch Gn conducts in the same direction as main switch Gp. Specifically, main switch Gn has its collector connected to a second end of primary winding Ls2 of transformer Tr, and its emitter connected to power supply terminal TN. Main diode Dn is connected in parallel with main switch Gn so that main diode Dn and main switch Gn conduct in respective directions opposite to each other. Specifically, main diode Dn has a cathode connected to the collector of main switch Gn and an anode connected to the emitter of main switch Gn. Snubber capacitor Crn is connected in parallel with main switch Gn and main diode Dn. Snubber diode Drn is connected in parallel with main switch Gn and main diode Dn and connected in series with snubber capacitor Crn, so that snubber diode Drn conducts in the same direction as main switch Gn. Specifically, snubber diode Drn has a cathode connected to a first end of snubber capacitor Crn and a second end of auxiliary reactor Lrn, and an anode connected to the collector of main switch Gn and the cathode of main diode Dn. Auxiliary switch Srn and auxiliary reactor Lrn are connected between the connection node of DC power supply Vp and DC power supply Vn and auxiliary switch Srp, namely power supply terminal TC, and the connection node of snubber capacitor Crn and snubber diode Drn, and connected in series to each other. Specifically, auxiliary switch Srn has a cathode connected to power supply terminal TC and an anode connected to a first end of auxiliary reactor Lrn. Auxiliary reactor Lrn has the first end connected to the anode of auxiliary switch Srn and the second end connected to the connection node of snubber capacitor Crn and snubber diode Drn.

Protection circuit 51 is connected between the emitter of main switch Gp and the collector of main switch Gn. In protection circuit 51, primary windings Ls1, Ls2 are connected between the emitter of main switch Gp and the collector of main switch Gn. Specifically, primary winding Ls1 has its first end connected to the emitter of main switch Gp and the cathode of snubber diode Drp, and its second end connected to AC output terminal TOUT and a first end of primary winding Ls2. Primary winding Ls2 has its first end connected to AC output terminal TOUT and the second end of primary winding Ls1, and its second end connected to the collector of main switch Gn and the anode of snubber diode Drn. Primary windings Ls1, Ls2 are wound in the same direction.

Secondary winding Lf is connected between the positive electrode of DC power supply Vp and the negative electrode of DC power supply Vn, and magnetically coupled with primary windings Ls1, Ls2. Specifically, secondary winding Lf has a first end connected to the anode of clamp diode Df and a second end connected to power supply terminal TN. Secondary winding Lf is wound in the opposite direction to primary windings Ls1, Ls2. Further, the turn ratio between the primary windings and the secondary winding of transformer Tr is 1:n where n>2 for example.

Clamp diode Df is connected between the positive electrode of DC power supply Vp and the negative electrode of DC power supply Vn, and connected in series with secondary winding Lf. Specifically, clamp diode Df has its cathode connected to power supply terminal TP and its anode connected to the first end of secondary winding Lf.

Soft-switching inverter 101 switches the DC power supplied from DC power supplies Vp, Vn by means of main switches Gp, Gn that are main arms, to thereby convert the DC power supplied from DC power supply Vp and DC power supply Vn into AC power and supply the AC power to the load through AC output terminal TOUT.

Snubber capacitor Crp is provided for preventing a voltage from being applied to main switch Gp when main switch Gp is turned off. Snubber capacitor Crn is provided for preventing a voltage from being applied to main switch Gn when main switch Gn is turned off.

Figure 2:
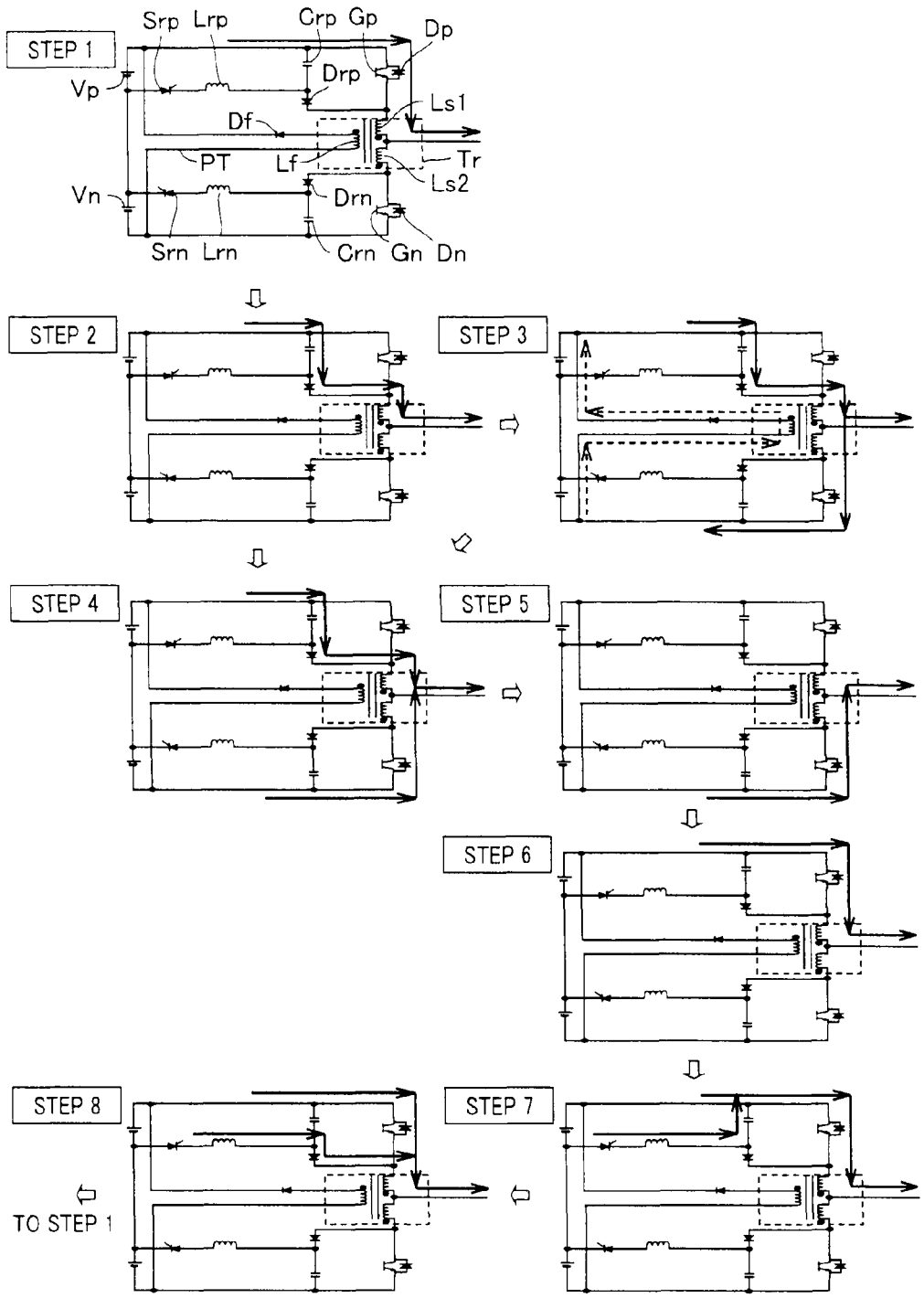
FIG. 2 is a diagram showing a flow of current in order of time, when the soft-switching inverter according to the first embodiment of the present invention performs electric power conversion.

In the soft-switching inverter shown in FIG. 2 of NPL 1, anode reactor Lbp is provided for preventing the current from flowing through main switch Gp when main switch Gp is turned on. Anode reactor Lbn is provided for preventing the current from flowing through main switch Gn when main switch Gn is turned on. In contrast, although soft-switching inverter 101 is not provided with anode reactors Lbp and Lbn, primary windings Ls1 and Ls2 of transformer Tr serve also as anode reactors Lbp and Lbn.

Protection circuit 51 has a current path PT between the positive electrode of DC power supply Vp and the negative electrode of DC power supply Vn. Protection circuit 51 uses transformer Tr to limit a maximum voltage applied to main switches Gp and Gn to a maximum value VM that is smaller than twice the output voltage of DC power supplies Vp and Vn.

In the following, a description will be given, with reference to the drawings, of operations of the soft-switching inverter when it performs electric power conversion, according to the first embodiment of the present invention. An operation in a positive period in which the current flows from soft-switching inverter 101 to a load will be described first, and an operation in a negative period in which the current flows from the load to soft-switching inverter 101 will be described next.

[Operation in Positive Period]

Figure 3:
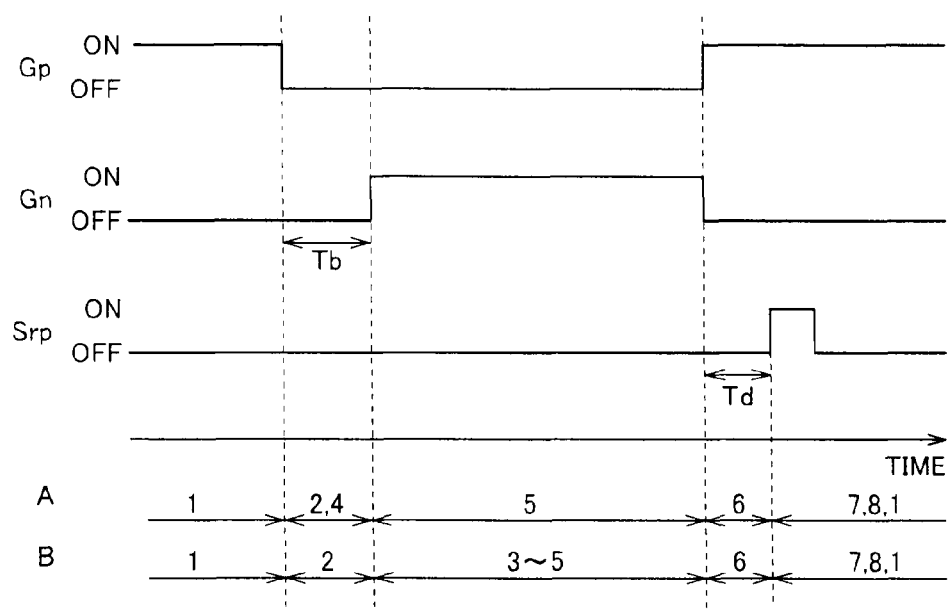
FIG. 3 is a diagram showing a switch control procedure when the soft-switching inverter according to the first embodiment of the present invention performs electric power conversion.

FIG. 2 is a diagram showing a flow of current in order of time, when the soft-switching inverter according to the first embodiment of the present invention performs electric power conversion. FIG. 3 is a diagram showing a switch control procedure when the soft-switching inverter according to the first embodiment of the present invention performs electric power conversion. Here, the output voltage of DC power supply Vp is referred to as Vp, and the output voltage of DC power supply Vn is referred to as Vn.

Firstly, an operation in the case where the load current is large to a certain extent will be described. In FIG. 3, the horizontal axis represents time, and the numbers in an upper row A arranged along this horizontal axis represent transition of the steps shown in FIG. 2 in the case where the load current is large to a certain extent. Specifically, when the load current is large to a certain extent, the state of the soft-switching inverter changes in the order of steps 1, 2, 4, 5, 6, 7, 8, 1.

Referring to FIGS. 2 and 3, a description will be given initially of the state where main switch Gp is controlled ON, main switch Gn is controlled OFF, auxiliary switches Srp and Srn are controlled OFF, and the current flows from DC power supply Vp through main switch Gp to the load (step 1).

In this state, main switch Gp is controlled OFF. Then, the current from DC power supply Vp is commutated to snubber capacitor Crp. Snubber capacitor Crp is accordingly charged and, when the voltage of snubber capacitor Crp becomes equal to the output voltage (Vp+Vn) of DC power supplies Vp and Vn, main diode Dn conducts (step 2).

Here, in step 2, main switch Gp is controlled OFF to cause the current to flow to snubber capacitor Crp. When main switch Gp is turned off, the charge of snubber capacitor Crp is zero, and therefore, no voltage is applied to main switch Gp. In this way, zero-volt switching is achieved.

Subsequently, as main diode Dn conducts, the current from DC power supply Vn flows through main diode Dn to the load. Further, the resonance between snubber capacitor Crp and the magnetizing inductance of primary windings Ls1 and Ls2 causes the current flowing from snubber capacitor Crp to snubber diode Drp to decrease and finally become zero. Then, snubber diode Drp is turned off and commutation of the current from DC power supply Vp is ended (step 4).

Subsequently, when a predetermined time Tb has passed from the time when main switch Gp was controlled OFF, main switch Gn is controlled ON. The direction of the flow of current from main diode Dn to the load, however, is opposite to the direction in which main switch Gn conducts, and therefore, main switch Gn does not conduct and the current continues flowing through main diode Dn to the load (step 5). Namely, when main switch Gn is controlled ON, the current does not flow through main switch Gn. In this way, zero-current switching is achieved.

Subsequently, immediately after main switch Gn is controlled OFF, main switch Gp is controlled ON. Then, commutation of the current from main diode Dn to main switch Gp starts. Accordingly, the current flowing from DC power supply Vp through main switch Gp increases to become equal to the load current. At the same time, the current flowing through main diode Dn becomes zero to cause main diode Dn to be turned off, and this commutation of the current is completed. Then, the current flows through main switch Gp to the load (step 6).

Subsequently, when a predetermined time Td has passed from the time when main switch Gn was controlled OFF, auxiliary switch Srp is controlled ON. Accordingly, snubber capacitor Crp starts being discharged. When this discharge is completed and the voltage of snubber capacitor Crp becomes zero, snubber diode Drp conducts (step 7).

Subsequently, conduction of snubber diode Drp causes the voltage from DC power supply Vp to be applied to auxiliary reactor Lrp. Accordingly, the current flowing through auxiliary switch Srp attenuates to become zero. Then, both auxiliary switch Srp and snubber diode Drp are turned off to return to the state of step 1 (step 8).

Secondly, an operation in the case where the load current is extremely small will be described. In FIG. 3, the numbers in a lower row B arranged along the horizontal axis represent transition of the steps shown in FIG. 2 in the case where the load current is extremely small. Specifically, when the load current is extremely small, the state of the soft-switching inverter changes in the order of steps 1, 2, 3, 4, 5, 6, 7, 8, 1.

In soft-switching inverter 101, when predetermined time Tb has passed from the time when main switch Gp was controlled OFF, main switch Gn is controlled ON. In the case where the load current is extremely small, however, charging of snubber capacitor Crp in the above-described step 2 takes an extremely long time, and therefore, main switch Gn is turned on while snubber capacitor Crp is charged in step 2. Accordingly, the state changes to the state of step 3. Here, an increase of the current flowing through main switch Gn when main switch Gn is controlled ON is limited by the magnetizing inductance of primary windings Ls1 and Ls2 of transformer Tr. In this way, zero-current switching is achieved.

In step 3, the resonant current generated by snubber capacitor Crp and the magnetizing inductance of primary windings Ls1 and Ls2 of transformer Tr causes snubber capacitor Crp to be charged. At this time, to the series circuit of primary windings Ls1 and Ls2 of transformer Tr, a voltage is applied that is a difference between the output voltage (Vp+Vn) of DC power supplies Vp and Vn and voltage Vc of snubber capacitor Crp. Thus, primary windings Ls1 and Ls2 are each allotted a half of the above-described voltage difference. Namely, a value VL of the voltage applied to primary windings Ls1 and Ls2 each is given by the following expression:

$$VL=\{(Vp+Vn)-Vc\}/2.$$

Since the turn ratio of transformer Tr is 1:n, a voltage of n×VL is induced on the secondary side. When voltage Vc of snubber capacitor Crp increases and the secondary side voltage of transformer Tr reaches the output voltage (Vp+Vn), clamp diode Df is turned on and snubber diode Drp is turned off. A maximum value VM of voltage Vc at this time is given by the following expression:

$$VM=(1+2/n)\times(Vp+Vn).$$

Then, the current flows as indicated by the broken line shown in step 3 of FIG. 2, the current flowing to snubber capacitor Crp becomes zero, and snubber capacitor Crp is not charged any more. Accordingly, voltage Vc of snubber capacitor Crp is clamped to VM. After this, the current flowing through main switch Gn decreases to become zero. Then, main switch Gn is turned off and main diode Dn conducts to cause the state to change to the state of above-described step 4. It should be noted here that main switch Gn has already been controlled ON, and thus ON-control of main switch Gn is not performed in step 5.

In the following, a detailed description will be given of the operation in steps 3 and 4 of the soft-switching inverter according to the first embodiment of the present invention.

Figure 4:
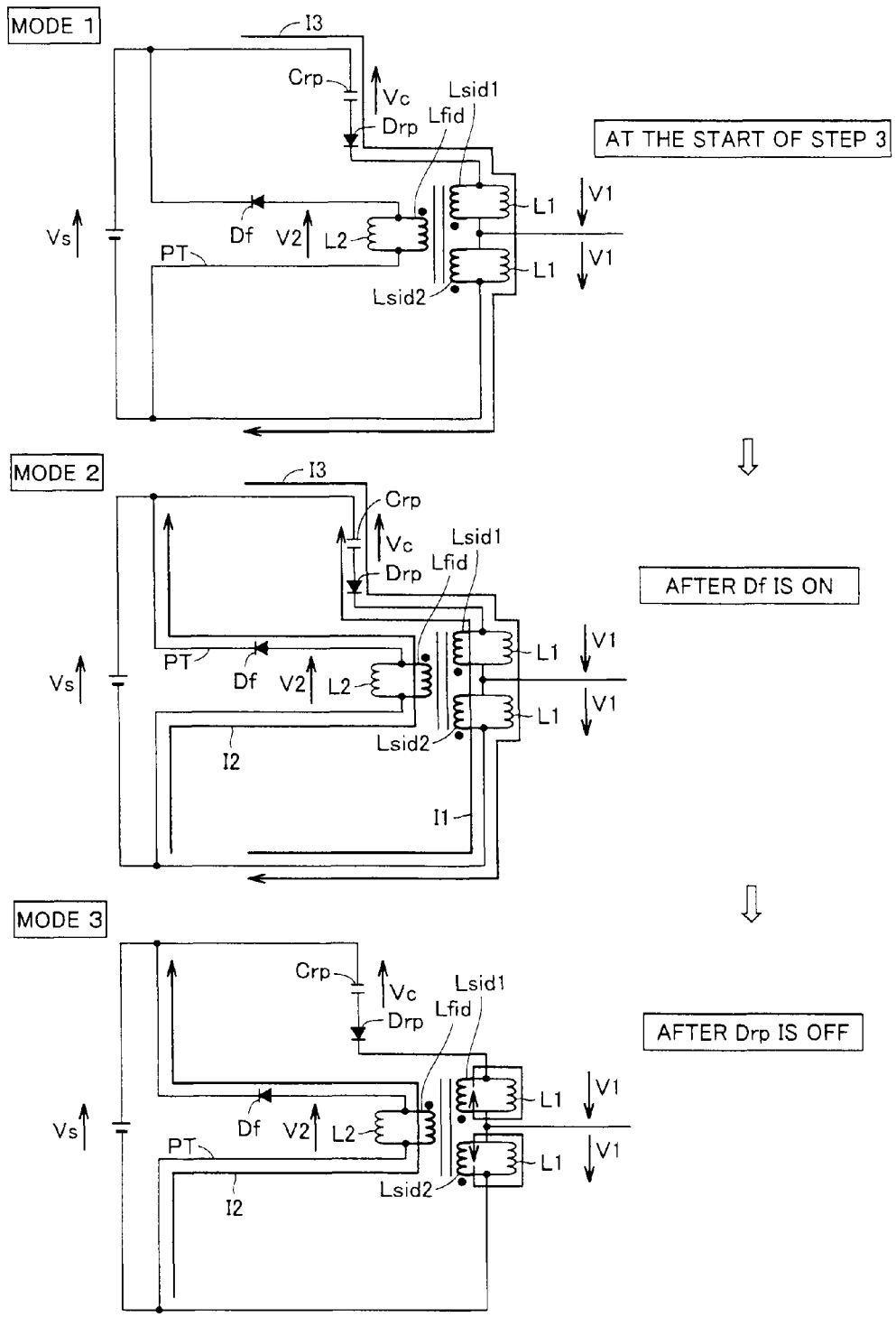
FIG. 4 is a diagram showing a flow of current in order of time, in steps 3 and 4 of the soft-switching inverter according to the first embodiment of the present invention.
Figure 5:
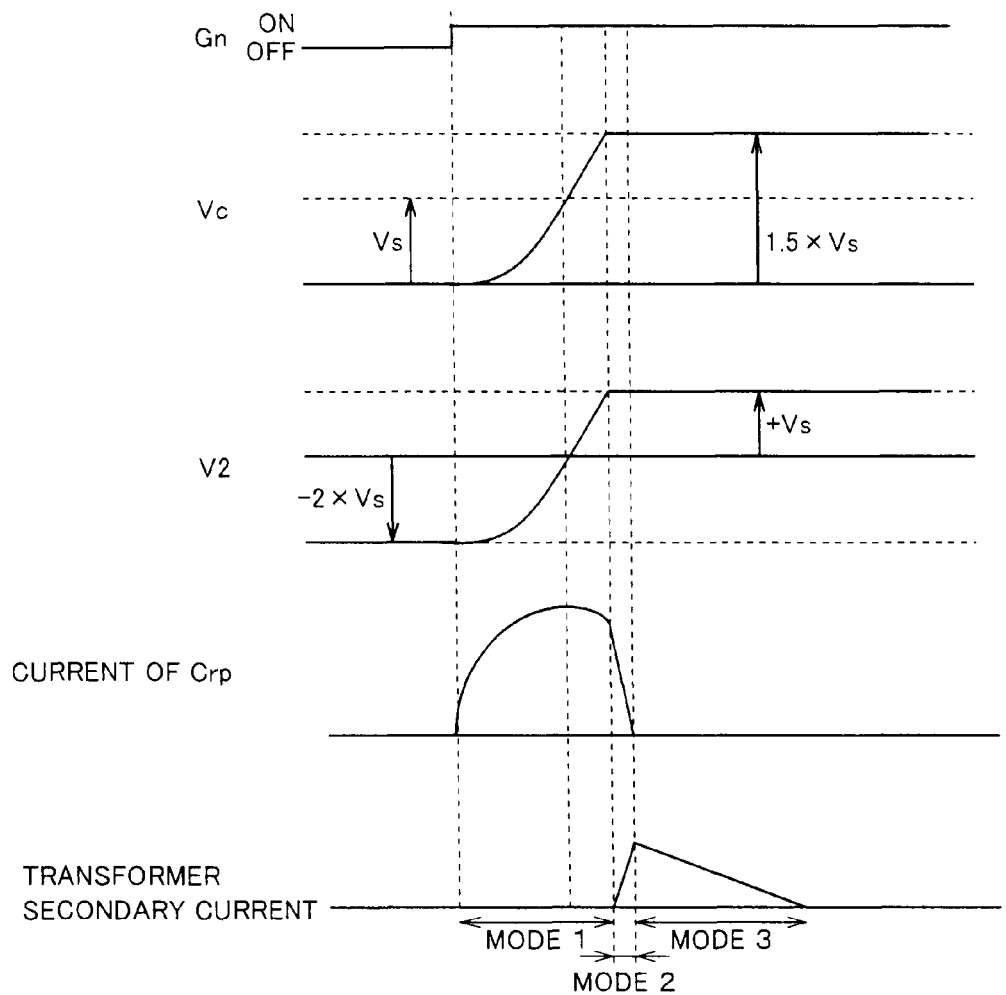
FIG. 5 is a waveform diagram of voltage and current in steps 3 and 4 of the soft-switching inverter according to the first embodiment of the present invention.

FIG. 4 is a diagram showing a flow of current in order of time, in steps 3 and 4 of the soft-switching inverter according to the first embodiment of the present invention. FIG. 5 is a waveform diagram of voltage and current in steps 3 and 4 of the soft-switching inverter according to the first embodiment of the present invention.

FIG. 4 shows an equivalent circuit of soft-switching inverter 101 in steps 3 and 4. In this equivalent circuit, the circuits that do not conduct in steps 3 and 4 are not shown and transformer Tr is shown in more detail in which an ideal transformer and magnetizing inductances that are present in parallel in respective windings are shown separately for the sake of easier understanding of the operation.

Specifically, Lsid1 and Lsid2 are primary windings of the ideal transformer, and Lfid is a secondary winding of the ideal transformer. L1 is a magnetizing inductance of the primary side of transformer Tr, and L2 is a magnetizing inductance of the secondary side of transformer Tr. Transformer Tr will be described here for which it is supposed that the turn ratio is 1:4. In this case. V2=4×V1 holds. Vs is a power supply into which two DC power supplies Vp and Vn are integrated, and the output voltage of the power supply has a value Vs=Vp+Vn. Vc is a voltage of snubber capacitor Crp, V1 is a voltage of the primary windings of transformer Tr, and V2 is a voltage of the secondary winding of transformer Tr. The direction indicated by each arrow is the positive direction.

Here, for the sake of easier understanding, a description will be given of the case where the load current is zero. In this case, snubber capacitor Crp is not charged at all in the above-described step 2, and the operation directly proceeds to step 3.

Referring to FIGS. 4 and 5, a voltage of (Vc−Vs) is applied to the primary side of transformer Tr. Namely, V1=(Vc−Vs)/2 holds. Secondary side voltage V2 of transformer Tr is V2=2× (Vc−Vs).

Here, step 3 will be described that is divided into three modes 1 to 3 in order of time. Specifically, mode 1 is a state at the start of step 3, mode 2 is a state after clamp diode Df is turned on, and mode 3 is a state after snubber diode Drp is turned off.

First, at the time when step 3 starts, voltage Vc is zero and accordingly V2<0 holds. Since clamp diode Df thus does not conduct, no current flows through the ideal transformer. In this period, resonant current I3 generated by magnetizing inductance L1 and snubber capacitor Crp flows through magnetizing inductance L1. Flow of resonant current I3 causes snubber capacitor Crp to be charged. Thus, voltage Vc of snubber capacitor Crp increases to reach Vc=1.5 Vs. At this time, V2=2×(Vc−Vs)=Vs holds. Namely, the secondary side voltage of transformer Tr becomes equal to power supply voltage Vs (mode 1).

Next, as the secondary side voltage of transformer Tr has reached power supply voltage Vs, clamp diode Df conducts. As clamp diode Df conducts, current I2 flows through secondary winding Lfid of the ideal transformer, and the transformer functions to cause current I1 which is twice as large as current I2 to flow through primary windings Lsid1, Lsid2 of the ideal transformer. Here, current I1 functions to cancel the charging current of snubber capacitor Crp, namely current I3. Therefore, current I3 flowing through snubber capacitor Crp and snubber diode Drp becomes zero, and snubber diode Drp is turned off. Then, charging of snubber capacitor Crp ends, voltage Vc does not increase any more, and thus voltage Vc is kept at 1.5×Vs (mode 2).

Subsequently, as snubber diode Drp is turned off, the magnetizing current of the primary side of transformer Tr reflows through each of primary windings Lsid1, Lsid2 of the ideal transformer. At this time, current I2 continues flowing through the secondary side of transformer Tr, and thus power supply voltage Vs is applied to the secondary side. Therefore, a voltage of V1=¼ Vs is induced on the primary side of transformer Tr by the function of the transformer, and the induced voltage causes the current flowing through magnetizing inductance L1 to attenuate and finally become zero. Consequently, the current flowing through primary windings Lsid1, Lsid2 of the ideal transformer also becomes zero, and the function of the transformer causes the current flowing through secondary winding Lfid to become zero as well. Thus, diode Df is turned off (mode 3).

As seen from the foregoing, regarding the soft-switching inverter according to the first embodiment of the present invention, in the case where resonance is to cause snubber capacitor Crp to be overcharged to a voltage higher than power supply voltage Vs, when voltage Vc of snubber capacitor Crp reaches voltage value VM, the energy that is to cause the current to flow through primary windings Ls1 and Ls2 of transformer Tr is transferred to secondary winding Lf of transformer Tr, and accordingly no charging current flows through snubber capacitor Crp. Then, snubber capacitor Crp is stopped from being charged, and the maximum voltage of snubber capacitor Crp is clamped to VM. Here, in the case where the turn ratio n of transformer Tr is n>2, VM is equal to or smaller than twice the voltage Vs. Further, in the case where n is increased, VM≈(Vp+Vn) holds. Therefore, voltage Vc of snubber capacitor Crp can be limited to a value which is close to power supply voltage Vs to a maximum possible extent.

[Operation in Negative Period]

Figure 6:
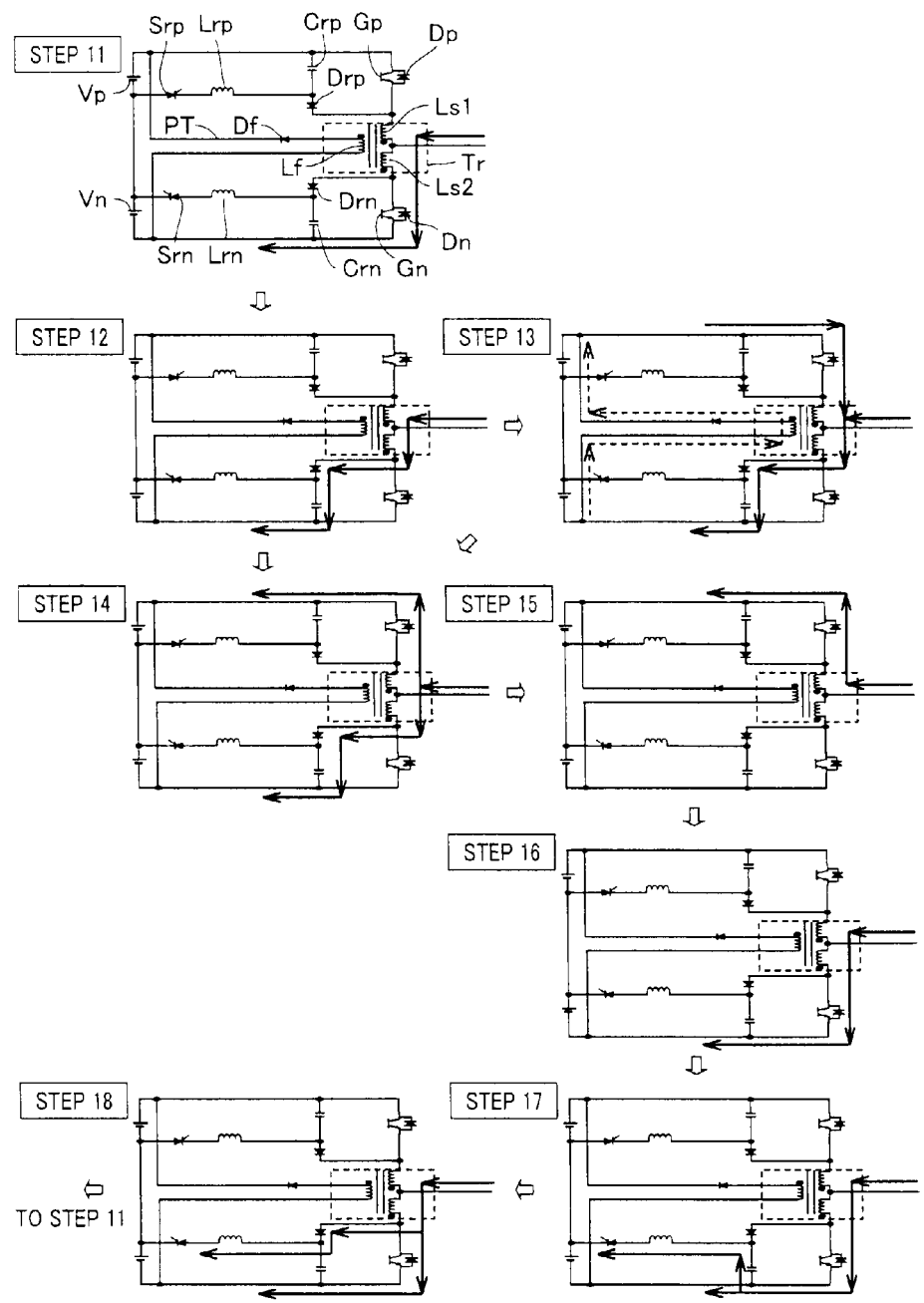
FIG. 6 is a diagram showing a flow of current in order of time, when the soft-switching inverter according to the first embodiment of the present invention performs electric power conversion.
Figure 7:
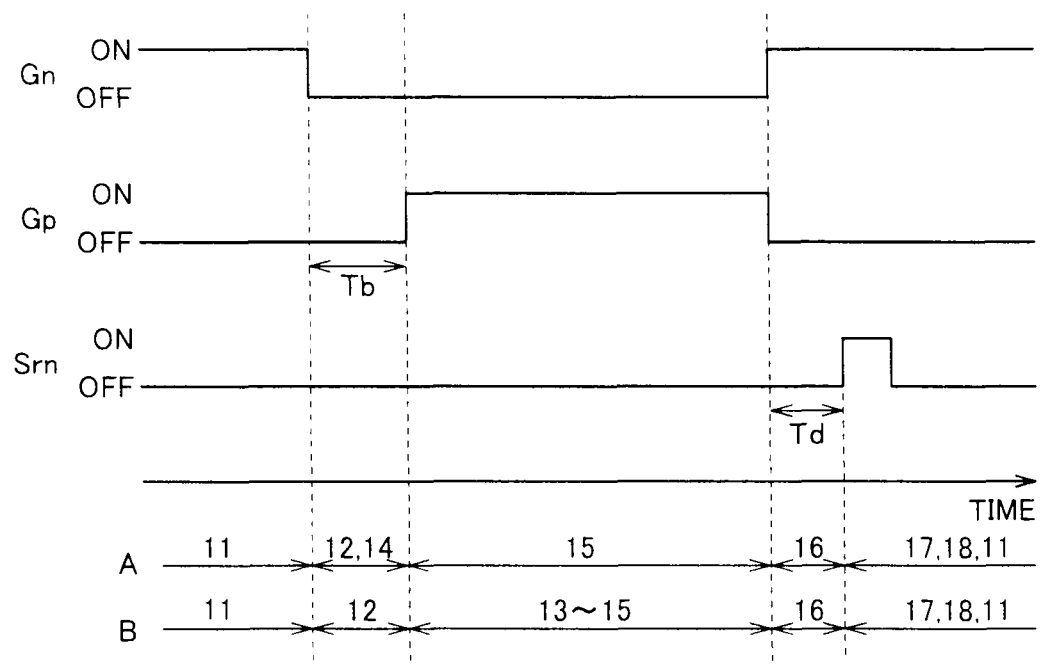
FIG. 7 is a diagram showing a switch control procedure when the soft-switching inverter according to the first embodiment of the present invention performs electric power conversion.

FIG. 6 is a diagram showing a flow of current in order of time, when the soft-switching inverter according to the first embodiment of the present invention performs electric power conversion. FIG. 7 is a diagram showing a switch control procedure when the soft-switching inverter according to the first embodiment of the present invention performs electric power conversion. Here, the output voltage of DC power supply Vn is referred to as Vn, and the output voltage of DC power supply Vp is referred to as Vp.

Firstly, an operation in the case where the load current is large to a certain extent will be described. In FIG. 7, the horizontal axis represents time, and the numbers in an upper row A arranged along this horizontal axis represent transition of the steps shown in FIG. 6 in the case where the load current is large to a certain extent. Specifically, when the load current is large to a certain extent, the state of the soft-switching inverter changes in the order of steps 11, 12, 14, 15, 16, 17, 18, 11.

Referring to FIGS. 6 and 7, a description will be given initially of the state where main switch Gn is controlled ON, main switch Gp is controlled OFF, auxiliary switches Srn and Srp are controlled OFF, and the current flows from the load to DC power supply Vn through main switch Gn (step 11).

In this state, main switch Gn is controlled OFF. Then, the current from the load is commutated to snubber capacitor Crn. Snubber capacitor Crn is accordingly charged and, when the voltage of snubber capacitor Crn becomes equal to the output voltage (Vn+Vp) of DC power supplies Vn and Vp, main diode Dp conducts (step 12).

Here, in step 12, main switch Gn is controlled OFF to cause the current to flow to snubber capacitor Crn. When main switch Gn is turned off, the charge of snubber capacitor Crn is zero, and therefore, no voltage is applied to main switch Gn. In this way, zero-volt switching is achieved.

Subsequently, as main diode Dp conducts, the current from the load flows through main diode Dp to DC power supply Vp. Further, the resonance between snubber capacitor Crn and the magnetizing inductance of primary windings Ls1 and Ls2 causes the current flowing from snubber diode Drn to snubber capacitor Crn to decrease and finally become zero. Then, snubber diode Drn is turned off and commutation of the current from the load is ended (step 14).

Subsequently, when a predetermined time Tb has passed from the time when main switch Gn was controlled OFF, main switch Gp is controlled ON. The direction of the flow of current from the load to main diode Dp, however, is opposite to the direction in which main switch Gp conducts, and therefore, main switch Gp does not conduct and the current continues flowing through main diode Dp to DC power supply Vp (step 15). Namely, when main switch Gp is controlled ON, the current does not flow through main switch Gp. In this way, zero-current switching is achieved.

Subsequently, immediately after main switch Gp is controlled OFF, main switch Gn is controlled ON. Then, commutation of the current from main diode Dp to main switch Gn starts. Accordingly, the current flowing from DC power supply Vn through main switch Gn increases to become equal to the load current. At the same time, the current flowing through main diode Dp becomes zero to cause main diode Dp to be turned off, and this commutation of the current is completed. Then, the current flows through main switch Gn to DC power supply Vn (step 16).

Subsequently, when a predetermined time Td has passed from the time when main switch Gp was controlled OFF, auxiliary switch Srn is controlled ON. Accordingly, snubber capacitor Crn starts being discharged. When this discharge has been completed and the voltage of snubber capacitor Crn becomes zero, snubber diode Drn conducts (step 17).

Subsequently, conduction of snubber diode Drn causes the voltage from DC power supply Vn to be applied to auxiliary reactor Lrn. Accordingly, the current flowing through auxiliary switch Srn attenuates to become zero. Then, both auxiliary switch Srn and snubber diode Drn are turned off to return to the state of step 11 (step 18).

Secondly, an operation in the case where the load current is extremely small will be described. In FIG. 7, the numbers in a lower row B arranged along the horizontal axis represent transition of the steps shown in FIG. 6 in the case where the load current is extremely small. Specifically, when the load current is extremely small, the state of the soft-switching inverter changes in the order of steps 11, 12, 13, 14, 15, 16, 17, 18, 11.

In soft-switching inverter 101, when predetermined time Tb has passed from the time when main switch Gn was controlled OFF, main switch Gp is controlled ON. In the case where the load current is extremely small, however, charging of snubber capacitor Crn in the above-described step 12 takes an extremely long time, and therefore, main switch Gp is turned on while snubber capacitor Crn is charged in step 12. Accordingly, the state changes to the state of step 13. Here, an increase of the current flowing through main switch Gp when main switch Gp is controlled ON is limited by the magnetizing inductance of primary windings Ls1 and Ls2 of transformer Tr. In this way, zero-current switching is achieved.

In step 13, the resonant current generated by snubber capacitor Crn and the magnetizing inductance of primary windings Ls1 and Ls2 of transformer Tr causes snubber capacitor Crn to be charged. At this time, to the series circuit of primary windings Ls1 and Ls2 of transformer Tr, a voltage is applied that is a difference between the output voltage (Vn+Vp) of DC power supplies Vn and Vp and voltage Vc of snubber capacitor Crn. Thus, primary windings Ls1 and Ls2 are each allotted a half of the above-described voltage difference. Namely, a value VL of the voltage applied to primary windings Ls1 and Ls2 each is given by the following expression:

$$VL=\{(Vn+Vp)-Vc\}/2.$$

Since the turn ratio of transformer Tr is 1:n, a voltage of n×VL is induced on the secondary side. When voltage Vc of snubber capacitor Crn increases and the secondary side voltage of transformer Tr reaches the output voltage (Vn+Vp), clamp diode Df is turned on and snubber diode Drn is turned off. A maximum value VM of voltage Vc at this time is given by the following expression:

$$VM=(1+2/n)\times(Vn+Vp).$$

Then, the current flows as indicated by the broken line shown in step 13 of FIG. 6, the current flowing to snubber capacitor Crn becomes zero, and snubber capacitor Crn is not charged any more. Accordingly, voltage Vc of snubber capacitor Crn is clamped to VM. After this, the current flowing through main switch Gp decreases to become zero. Then, main switch Gp is turned off and main diode Dp conducts to cause the state to change to the state of above-described step 14. It should be noted here that main switch Gp has already been controlled ON, and thus ON-control of main switch Gp is not performed in step 15.

In the following, a detailed description will be given of the operation in steps 13 and 14 of the soft-switching inverter according to the first embodiment of the present invention.

Figure 8:
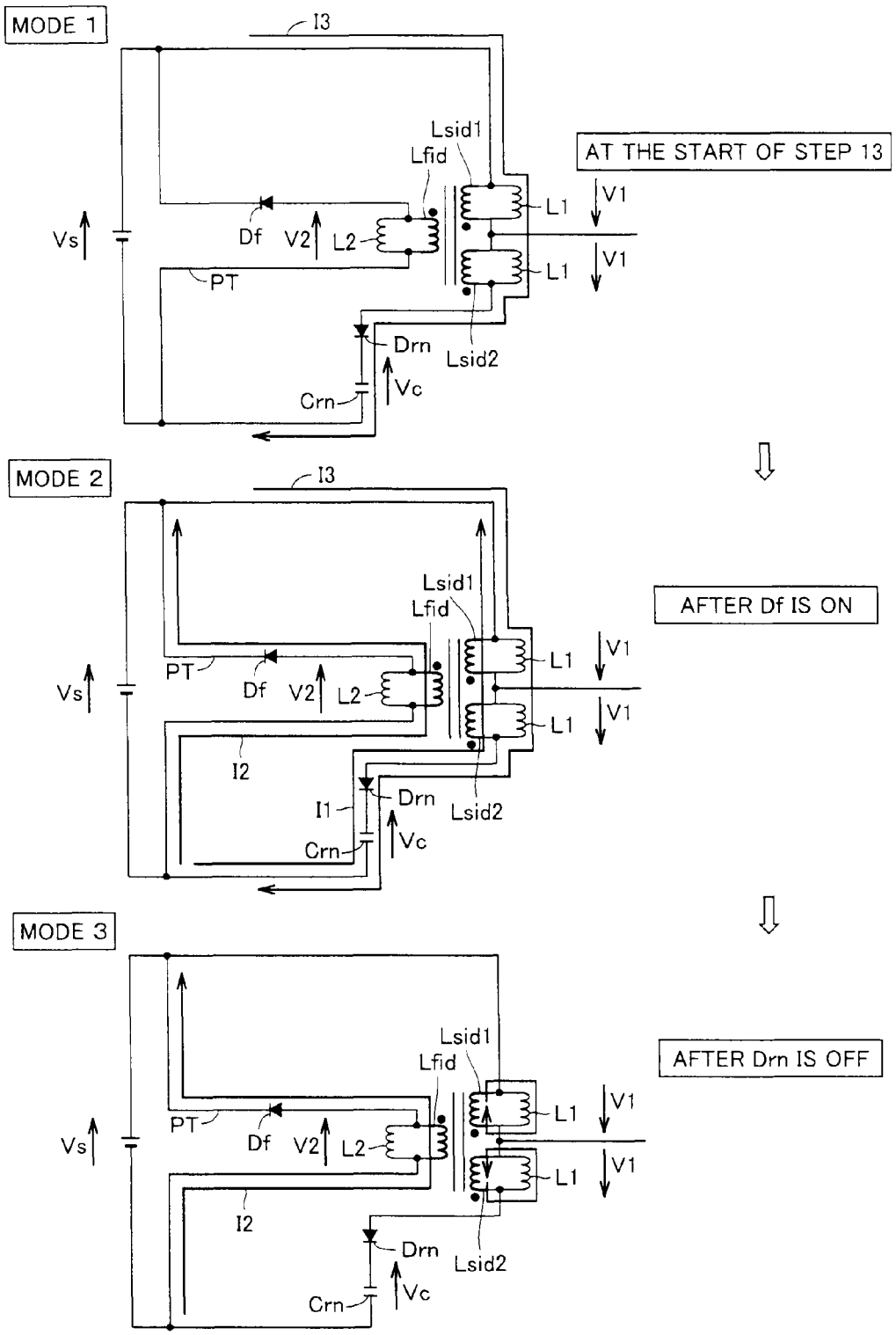
FIG. 8 is a diagram showing a flow of current in order of time, in steps 13 and 14 of the soft-switching inverter according to the first embodiment of the present invention.
Figure 9:
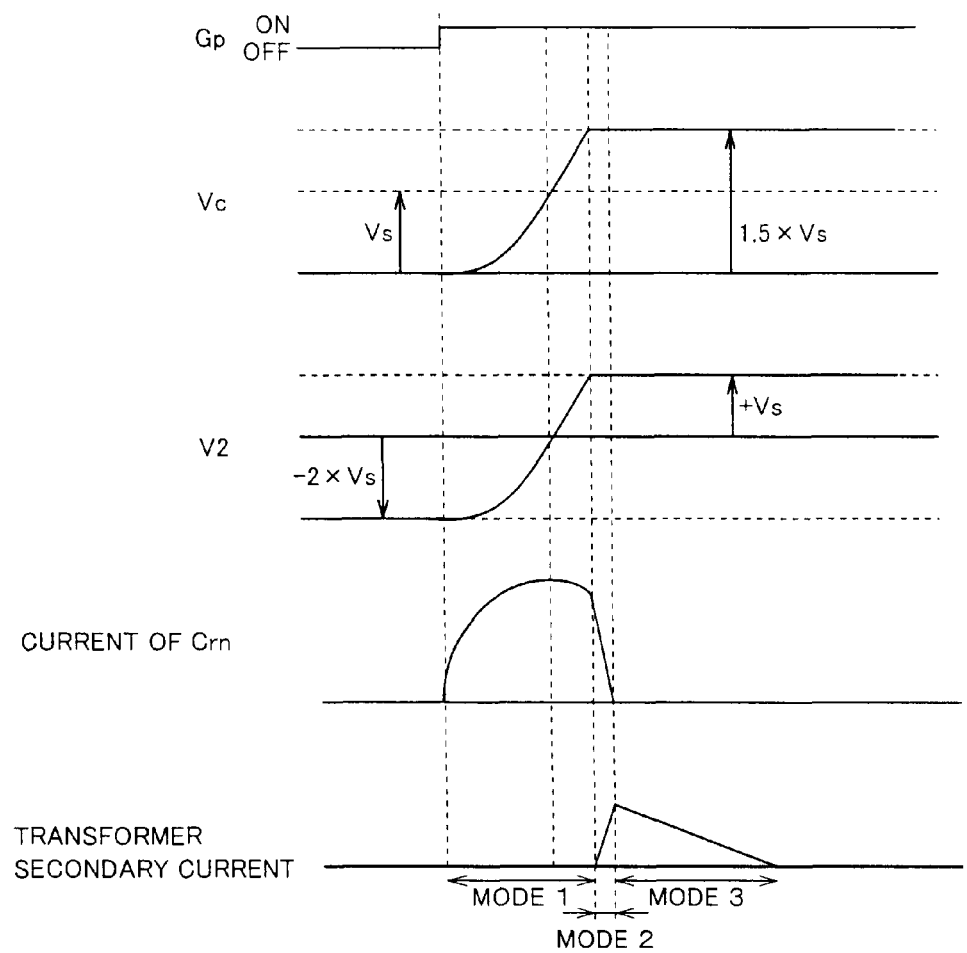
FIG. 9 is a waveform diagram of voltage and current in steps 13 and 14 of the soft-switching inverter according to the first embodiment of the present invention.

FIG. 8 is a diagram showing a flow of current in order of time, in steps 13 and 14 of the soft-switching inverter according to the first embodiment of the present invention. FIG. 9 is a waveform diagram of voltage and current in steps 13 and 14 of the soft-switching inverter according to the first embodiment of the present invention.

FIG. 8 shows an equivalent circuit of soft-switching inverter 101 in steps 13 and 14. In this equivalent circuit, the circuits that do not conduct in steps 13 and 14 are not shown and transformer Tr is shown in more detail in which an ideal transformer and magnetizing inductances that are present in parallel in respective windings are shown separately for the sake of easier understanding of the operation.

Specifically, Lsid1 and Lsid2 are primary windings of the ideal transformer, and Lfid is a secondary winding of the ideal transformer. L1 is a magnetizing inductance of the primary side of transformer Tr, and L2 is a magnetizing inductance of the secondary side of transformer Tr. Transformer Tr will be described here for which it is supposed that the turn ratio is 1:4. In this case, V2=4×V1 holds. Vs is a power supply into which two DC power supplies Vn and Vp are integrated, and the output voltage of the power supply has a value Vs=Vn+Vp. Vc is a voltage of snubber capacitor Crn, V1 is a voltage of the primary windings of transformer Tr, and V2 is a voltage of the secondary winding of transformer Tr. The direction indicated by each arrow is the positive direction.

Here, for the sake of easier understanding, a description will be given of the case where the load current is zero. In this case, snubber capacitor Crn is not charged at all in the above-described step 12, and the operation directly proceeds to step 13.

Referring to FIGS. 8 and 9, a voltage of (Vc−Vs) is applied to the primary side of transformer Tr. Namely, V1=(Vc−Vs)/2 holds. Secondary side voltage V2 of transformer Tr is V2=2×(Vc−Vs).

Here, step 13 will be described that is divided into three modes 1 to 3 in order of time. Specifically, mode 1 is a state at the start of step 13, mode 2 is a state after clamp diode Df is turned on, and mode 3 is a state after snubber diode Drn is turned off.

First, at the time when step 13 starts, voltage Vc is zero and accordingly V2<0 holds. Since clamp diode Df thus does not conduct, no current flows through the ideal transformer. In this period, resonant current I3 of magnetizing inductance L1 and snubber capacitor Crn flows through magnetizing inductance L1. Flow of resonant current I3 causes snubber capacitor Crn to be charged. Thus, voltage Vc of snubber capacitor Crn increases to reach Vc=1.5 Vs. At this time, V2=2×(Vc−Vs)=Vs holds. Namely, the secondary side voltage of transformer Tr becomes equal to power supply voltage Vs (mode 1).

Next, as the secondary side voltage of transformer Tr has reached power supply voltage Vs, clamp diode Df conducts.

As clamp diode Df conducts, current I2 flows through secondary winding Lfid of the ideal transformer, and the transformer functions to cause current I1 which is twice as large as current I2 to flow through primary windings Lsid1, Lsid2 of the ideal transformer. Here, current I1 functions to cancel the charging current of snubber capacitor Crn, namely current I3. Therefore, current I3 flowing through snubber capacitor Crn and snubber diode Drn becomes zero, and snubber diode Drn is turned off. Then, charging of snubber capacitor Crn ends, voltage Vc does not increase any more, and thus voltage Vc is kept at 1.5×Vs (mode 2).

Subsequently, as snubber diode Drn is turned off, the magnetizing current of the primary side of transformer Tr reflows through each of primary windings Lsid1, Lsid2 of the ideal transformer. At this time, current I2 continues flowing through the secondary side of transformer Tr, and thus power supply voltage Vs is applied to the secondary side. Therefore, a voltage of $V1=\frac{1}{4} Vs$ is induced on the primary side of transformer Tr by the function of the transformer, and the induced voltage causes the current flowing through magnetizing inductance L1 to attenuate and finally become zero. Consequently, the current flowing through primary windings Lsid1, Lsid2 of the ideal transformer also becomes zero, and the function of the transformer causes the current flowing through secondary winding Lfid to become zero as well. Thus, diode Df is turned off (mode 3).

As seen from the foregoing, regarding the soft-switching inverter according to the first embodiment of the present invention, in the case where resonance is to cause snubber capacitor Crn to be overcharged to a voltage higher than power supply voltage Vs, when voltage Vc of snubber capacitor Crn reaches voltage value VM, the energy that is to cause the current to flow through primary windings Ls1 and Ls2 of transformer Tr is transferred to secondary winding Lf of transformer Tr, and accordingly no charging current flows through snubber capacitor Crn. Then, snubber capacitor Crn is stopped from being charged, and the maximum voltage of snubber capacitor Crn is clamped to VM. Here, in the case where the turn ratio n of transformer Tr is n>2, VM is equal to or smaller than twice the voltage Vs. Further, in the case where n is increased, VM≈(Vn+Vp) holds. Therefore, voltage Vc of snubber capacitor Crn can be limited to a value which is close to power supply voltage Vs to a maximum possible extent.

Soft-switching inverter 101 repeats the operation from steps 1 to 8 shown in FIG. 2, as an operation in a positive period, and repeats the operation from steps 11 to 18 shown in FIG. 6, as an operation in a negative period. Soft-switching inverter 101 alternately performs the positive-period operation and the negative-period operation as described above to thereby supply AC power to the load.

As for the soft-switching inverter disclosed in NPL 1, the snubber capacitor is charged to twice the power supply voltage at the maximum under a light load condition, and a high voltage is applied to the main switch and the main diode. These devices are thus required to have a breakdown voltage which is at least twice as large as the power supply voltage, resulting in the problems of an increased size and a high cost of the soft-switching inverter.

In contrast, as for the soft-switching inverter according to the first embodiment of the present invention, protection circuit 51 causes the charging current, which is to flow from DC power supply Vp and DC power supply Vn to snubber capacitor Crp or snubber capacitor Crn, to flow between the positive electrode of DC power supply Vp and the negative electrode of DC power supply Vn through current path PT, in the case where the voltage applied to snubber capacitor Crp becomes a predetermined value or more, or in the case where the voltage applied to snubber capacitor Crn becomes a predetermined value or more.

More specifically, protection circuit 51 receives a voltage which is a difference between the output voltage of DC power supply Vp and DC power supply Vn and the voltage applied to snubber capacitor Crp, or a voltage which is a difference between the output voltage of DC power supply Vp and DC power supply Vn and the voltage applied to snubber capacitor Crn, and generates a voltage by stepping up the received voltage and, based on the generated voltage, switches whether to flow the charging current between the positive electrode of DC power supply Vp and the negative electrode of DC power supply Vn through current path PT or not.

Specifically, in the soft-switching inverter according to the first embodiment of the present invention, the transformer is inserted and the turn ratio of the transformer is set to 1:n (n>2) to thereby limit the maximum charging voltage of the snubber capacitor to at most twice the power supply voltage. In other words, in the case where the snubber capacitor is to be overcharged through resonance to a voltage which is higher than the power supply voltage, protection circuit 51 transfers the energy, which is to cause the current to flow to the primary winding of the transformer, to the secondary winding of the transformer, when the voltage applied to the snubber capacitor reaches a predetermined voltage. Accordingly, the charging current is prevented from flowing through the snubber capacitor, the snubber capacitor is thus stopped from being charged, and the voltage applied to the snubber capacitor is clamped. The turn ratio n of transformer Tr is set to n>2, so that the clamp voltage is equal to or less than twice the power supply voltage. The turn ratio n may be increased to limit the voltage applied to the snubber capacitor to a value which is close to the power supply voltage to a maximum possible extent.

Thus, the voltage applied to the main switch and the main diode is also restricted, and the breakdown voltage of these devices can therefore be made lower. Accordingly, the power converter can be downsized and the cost can also be reduced. On the contrary, devices with the same breakdown voltage can be used without changing the breakdown voltage of these devices to thereby obtain an output voltage higher than the conventionally obtained one. Namely, the limited charging voltage of the snubber capacitor can improve the voltage utilization ratio of the main switch and the main diode, so that devices having the same breakdown voltage can be used to obtain a higher output voltage.

Here, the protection circuit is not limited to the configuration shown in FIG. 1. The protection circuit may have any configuration as long as the charging current which is to flow from DC power supply Vp and DC power supply Vn to snubber capacitor Crp or snubber capacitor Crn is allowed to flow to another current path, in the case where the voltage applied to snubber capacitor Crp becomes a predetermined value or more or in the case where the voltage applied to snubber capacitor Crn becomes a predetermined value or more.

Figure 10:
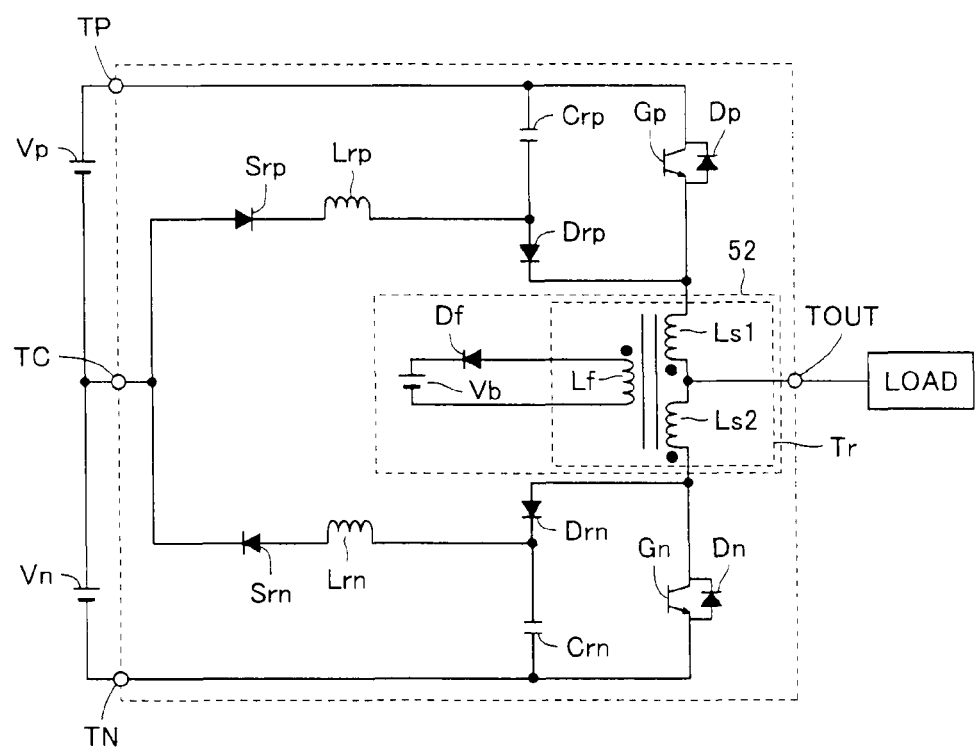
FIG. 10 is a diagram showing a configuration of a modification of the soft-switching inverter according to the first embodiment of the present invention.

FIG. 10 is a diagram showing a configuration of a modification of the soft-switching inverter according to the first embodiment of the present invention.

Referring to FIG. 10, this soft-switching inverter differs from soft-switching inverter 101 in that the former includes a protection circuit 52 instead of protection circuit 51. Protection circuit 52 includes a transformer Tr, a clamp diode Df, and a DC power supply Vb. DC power supply Vb has a positive electrode connected to the cathode of clamp diode Df and a negative electrode connected to the anode of clamp diode Df.

While the soft-switching inverter according to the first embodiment of the present invention is configured so that the cathode of clamp diode Df is connected to the positive electrode of DC power supply Vp, the soft-switching inverter is not limited to this configuration. Specifically, the soft-switching inverter may be configured so that protection circuit 52 includes DC power supply Vb separately from DC power supplies Vp and Vn as shown in FIG. 10.

When the voltage applied to snubber capacitor Crp becomes a predetermined value or more or when the voltage applied to snubber capacitor Crn becomes a predetermined value or more, protection circuit 52 causes the charging current, which is to flow from DC power supply Vp and DC power supply Vn to snubber capacitor Crp or snubber capacitor Crn, to DC power supply Vb through clamp diode Df.

This configuration enables clamp diode Df to be turned on before the voltage applied to the snubber capacitor becomes for example twice the output voltage of DC power supplies Vp and Vn, without using transformer Tr to step up the voltage which is a difference between the output voltage of DC power supplies Vp and Vn and voltage Vc of the snubber capacitor. Therefore, the voltage applied to the snubber capacitor can be limited to at most twice the output voltage of DC power supplies Vp and Vn.

In the following, another embodiment of the present invention will be described with reference to a drawing. In the drawing, the same or corresponding component is denoted by the same reference character, and the description thereof will not be repeated.

<Second Embodiment>

The present embodiment relates to a soft-switching inverter including an alternative circuit of the transformer, in contrast to the soft-switching inverter of the first embodiment. The soft-switching inverter of the present embodiment is similar to the soft-switching inverter of the first embodiment except for the details described below.

Figure 11:
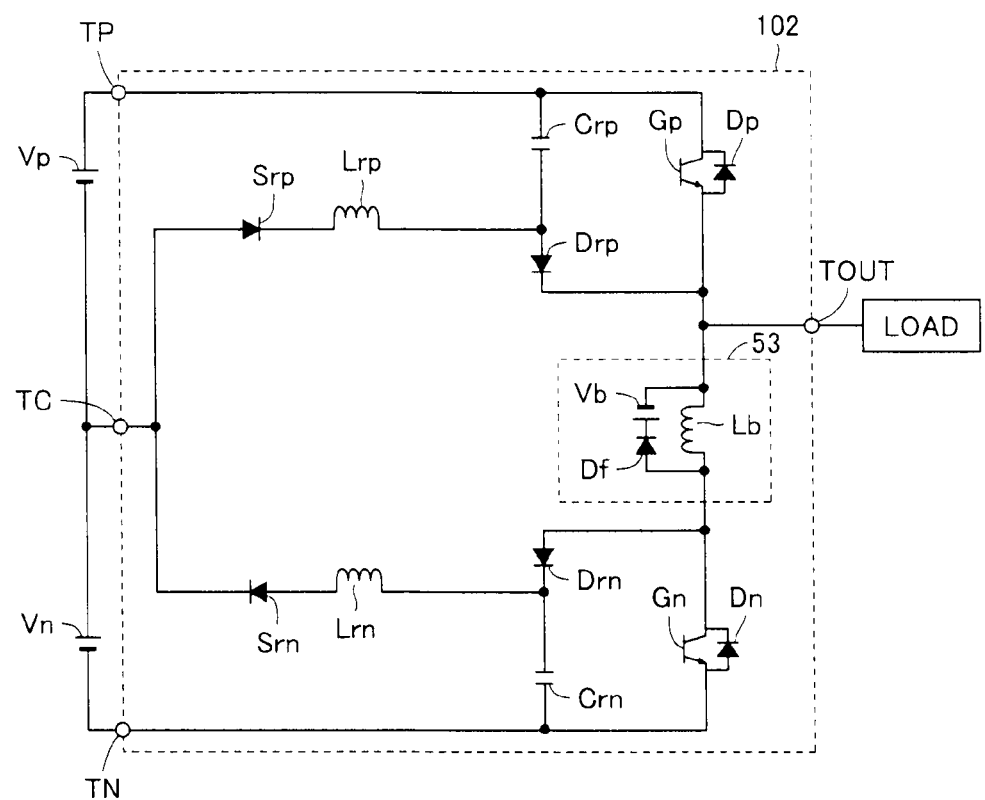
FIG. 11 is a diagram showing a configuration of a soft-switching inverter according to a second embodiment of the present invention.

FIG. 11 is a diagram showing a configuration of the soft-switching inverter according to the second embodiment of the present invention.

Referring to FIG. 11, soft-switching inverter 102 includes a protection circuit 53 instead of protection circuit 51 of the soft-switching inverter in the first embodiment of the present invention. Protection circuit 53 includes an anode reactor Lb, a clamp diode Df, and a DC power supply Vb. Anode reactor Lb has a first end connected to the emitter of main switch Gp and a second end connected to the collector of main switch Gn. DC power supply Vb and clamp diode Df are connected in series to each other between the opposing ends of anode reactor Lb. Specifically, DC power supply Vb has a positive electrode connected to the cathode of clamp diode Df and a negative electrode connected to the first end of anode reactor Lb. Clamp diode Df has an anode connected to the second end of anode reactor Lb.

In the case where the voltage applied to snubber capacitor Crp becomes a predetermined value or more or in the case where the voltage applied to snubber capacitor Crn becomes a predetermined value or more, protection circuit 53 allows the charging current, which is to flow from DC power supply Vp and DC power supply Vn to snubber capacitor Crp or snubber capacitor Crn, to flow to DC power supply Vb through clamp diode Df.

Thus, the transformer may not be used in the protection circuit. In contrast, the configuration using the transformer in the protection circuit, like the soft-switching inverter in the first embodiment of the present invention, can be a simplified configuration, since it is necessary to separately provide a DC power supply.

Other configuration and operation details of the present embodiment are similar to those of the soft-switching inverter in the first embodiment, and the detailed description thereof will not be repeated here.

In the following, another embodiment of the present invention will be described with reference to a drawing. In the drawing, the same or corresponding component is denoted by the same reference character, and the description thereof will not be repeated.

<Third Embodiment>

The present embodiment relates to a soft-switching inverter including additional anode reactors, in contrast to the soft-switching inverter of the first embodiment. The present embodiment is similar to the soft-switching inverter of the first embodiment except for the details described below.

Figure 12:
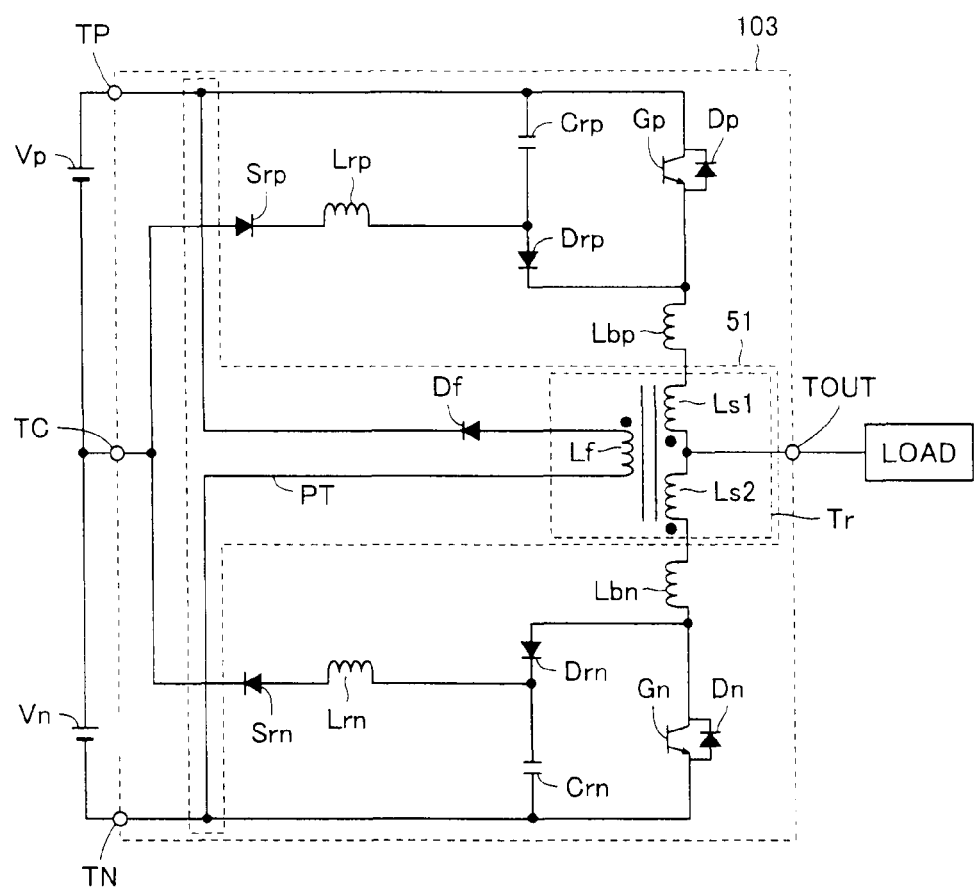
FIG. 12 is a diagram showing a configuration of a soft-switching inverter according to a third embodiment of the present invention.

FIG. 12 is a diagram showing a configuration of the soft-switching inverter according to a third embodiment of the present invention.

Referring to FIG. 12, soft-switching inverter 103 differs from the soft-switching inverter of the first embodiment in that the former further includes anode reactors Lbp, Lbn.

Anode reactor Lbp has a first end connected to the cathode of snubber diode Drp, the emitter of main switch Gp, and the anode of main diode Dp, and a second end connected to the first end of primary winding Ls1. Anode reactor Lbn has a first end connected to the second end of primary winding Ls2, and a second end connected to the anode of snubber diode Drn, the collector of main switch Gn, and the cathode of main diode Dn.

As to other configuration and operation details, the present embodiment is similar to the soft-switching inverter of the first embodiment, and the detailed description thereof will not be repeated here.

In the following, still another embodiment of the present invention will be described with reference to a drawing. In the drawing, the same or corresponding component is denoted by the same reference character, and the description thereof will not be repeated.

<Fourth Embodiment>

The present embodiment relates to a soft-switching inverter including additional anode reactors, in contrast to the soft-switching inverter of the first embodiment. The present embodiment is similar to the soft-switching inverter of the first embodiment except for the details described below.

Figure 13:
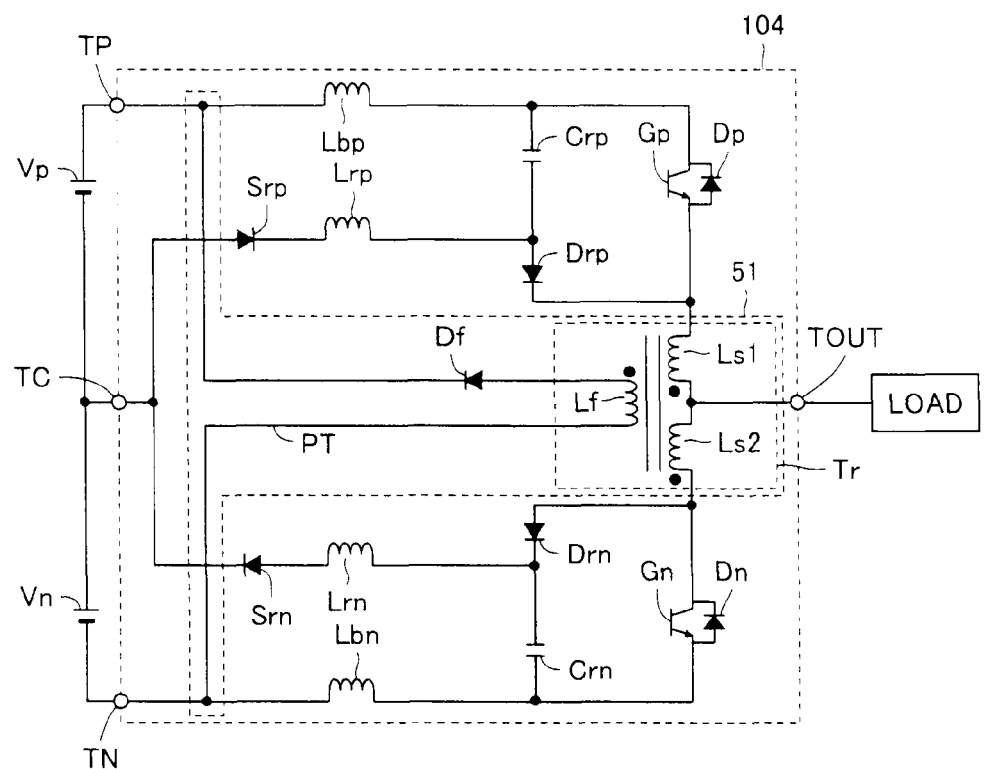
FIG. 13 is a diagram showing a configuration of a soft-switching inverter according to a fourth embodiment of the present invention.

FIG. 13 is a diagram showing a configuration of the soft-switching inverter according to a fourth embodiment of the present invention.

Referring to FIG. 13, soft-switching inverter 104 differs from the soft-switching inverter of the first embodiment in that the former further includes anode reactors Lbp, Lbn.

Anode reactor Lbp has a first end connected to power supply terminal TP and the cathode of clamp diode Df, and a second end connected to the first end of snubber capacitor Crp, the collector of main switch Gp, and the cathode of main diode Dp. Anode reactor Lbn has a first end connected to power supply terminal TN and the second end of secondary winding Lf, and a second end connected to the second end of snubber capacitor Crn, the emitter of main switch Gn, and the anode of main diode Dn.

As to other configuration and operation details, the present embodiment is similar to the soft-switching inverter of the first embodiment, and the detailed description thereof will not be repeated.

It should be construed that the embodiments disclosed herein are by way of illustration in all respects, not by way of limitation. It is intended that the scope of the present invention is defined by claims, not by the above description of the embodiments, and encompasses all modifications and variations equivalent in meaning and scope to the claims.

Reference Signs List 51, 52, 53 protection circuit; 101 soft-switching inverter (power converter); Vp, Vn DC power supply; TP, TC, TN power supply terminal; TOUT AC output terminal; Gp, Gn main switch; Dp, Dn main diode; Crp, Crn snubber capacitor; Drp, Drn snubber diode; Srp, Srn auxiliary switch; Lrp, Lrn auxiliary reactor; Tr transformer; Df clamp diode; Ls1, Ls2 primary winding; Lf secondary winding; Vb DC power supply; Lb, Lbp, Lbn anode reactor

The invention claimed is:

1. A power converter converting DC power into AC power and supplying the AC power to a load, the DC power being supplied from a first DC power supply having a first electrode and a second electrode and a second DC power supply having a first electrode connected to the second electrode of said first DC power supply and a second electrode, the power converter comprising:
a first main switch having a first end coupled to the first electrode of said first DC power supply and a second end coupled to said load;
a first main diode connected in parallel with said first main switch so that the first main diode and said first main switch conduct in respective directions opposite to each other;
a first snubber capacitor connected in parallel with said first main switch and said first main diode;
a first snubber diode connected in series with said first snubber capacitor and connected between said first snubber capacitor and the second end of said first main switch, so that the first snubber diode and said first main switch conduct in the same direction;
a first auxiliary switch and a first auxiliary reactor connected between a connection node of said first DC power supply and said second DC power supply and a connection node of said first snubber capacitor and said first snubber diode and connected in series to each other;
a second main switch having a first end coupled to the second end of said first main switch and a second end coupled to the second electrode of said second DC power supply, and provided so that the second main switch and said first man switch conduct in the same direction;
a second main diode connected in parallel with said second main switch so that the second main diode and said second main switch conduct in respective directions opposite to each other;
a second snubber capacitor connected in parallel with said second main switch and said second main diode;
a second snubber diode connected in series with said second snubber capacitor and connected between said second snubber capacitor and the first end of said second main switch, so that the second snubber diode and said second main switch conduct in the same direction;
a second auxiliary switch and a second auxiliary reactor connected between a connection node of said first DC power supply and said second DC power supply and said first auxiliary switch or said first auxiliary reactor, and a connection node of said second snubber capacitor and said second snubber diode, and connected in series to each other; and
a protection circuit for allowing a charging current that is possibly to flow from said first DC power supply and said second DC power supply to said first snubber capacitor or said second snubber capacitor, to flow to another current path, in a case where a voltage applied to said first snubber capacitor becomes a predetermined value or more or in a case where a voltage applied to said second snubber capacitor becomes a predetermined value or more.

2. The power converter according to claim 1, wherein said protection circuit has a current path between the first electrode of said first DC power supply and the second electrode of said second DC power supply, and causes said charging current to flow between the first electrode of said first DC power supply and the second electrode of said second DC power supply through said current path, in a case where a voltage applied to said first snubber capacitor becomes a predetermined value or more or in a case where a voltage applied to said second snubber capacitor becomes a predetermined value or more.

3. The power converter according to claim 2, wherein said protection circuit receives a voltage that is a difference between an output voltage of said first DC power supply and said second DC power supply and a voltage applied to said first snubber capacitor, or a voltage that is a difference between an output voltage of said first DC power supply and said second DC power supply and a voltage applied to said second snubber capacitor, generates a voltage by stepping up said received voltage and, based on said generated voltage, switches whether or not to flow said charging current between the first electrode of said first DC power supply and the second electrode of said second DC power supply through said current path.

4. The power converter according to claim 3, wherein said protection circuit is connected between the second end of said first main switch and the first end of said second main switch.

5. The power converter according to claim 1, wherein said protection circuit receives a voltage that is a difference between an output voltage of said first DC power supply and said second DC power supply and a voltage applied to said first snubber capacitor, or a voltage that is a difference between an output voltage of said first DC power supply and said second DC power supply and a voltage applied to said second snubber capacitor, generates a voltage by stepping up said received voltage and, based on said generated voltage, switches whether or not to flow said charging current to another current path.

6. The power converter according to claim 1, wherein said protection circuit includes:
a primary winding connected between the second end of said first main switch and the first end of said second main switch;
a secondary winding connected between the first electrode of said first DC power supply and the second electrode of said second DC power supply, and magnetically coupled with said primary winding; and
a clamp diode connected between the first electrode of said first DC power supply and the second electrode of said second DC power supply, and connected in series with said secondary winding.

* * * * *